Sept. 12, 1939.　　　　　J. T. BERRY　　　　　2,172,341
ENROBER BELT

Filed Nov. 11, 1936

WITNESS:

INVENTOR
Jack T. Berry
BY
ATTORNEYS.

Patented Sept. 12, 1939

2,172,341

UNITED STATES PATENT OFFICE 2,172,341

ENROBER BELT

Jack T. Berry, Philadelphia, Pa., assignor to Main Belting Company, Philadelphia, Pa., a corporation of Pennsylvania Application November 11, 1936, Serial No. 110,234

1 Claim. (Cl. 198—193)

This invention relates to an improvement in enrober belts.

Enrober belts, as is well known, are used in connection with the manufacture of candy and, more particularly, in connection with the manufacture of coated candies, as, for example, various candies comprising a body coated with chocolate, in which connection they are used to transfer coated candies from a conveyor on which they are hot coated to and through a cooling device.

Enrober belts as heretofore known have been of various structure and coated material, but have not been found entirely satisfactory for their intended purpose, due variously to chemical action, temperature change and to the adherence or sticking of coated candies thereto on cooling.

Now, in accordance with this invention an enrober belt having essentially novel characteristics and free from the disadvantages found in such belts heretofore is provided.

Having now indicated in a general way the nature and purpose of the invention, I will proceed to a detailed description thereof with reference to the accompanying drawing, in which I have illustrated a preferred embodiment and in which.

Figure 1:
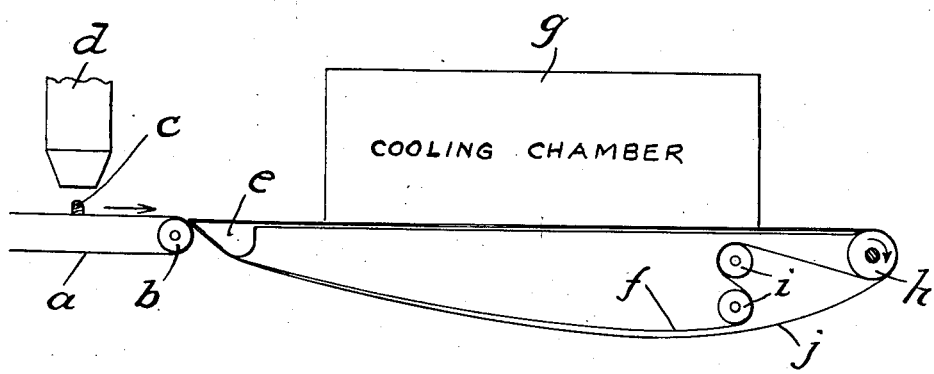
Figure 1 is a diagrammatic side view of an enrober equipped with an enrober belt embodying this invention.
Figure 2:
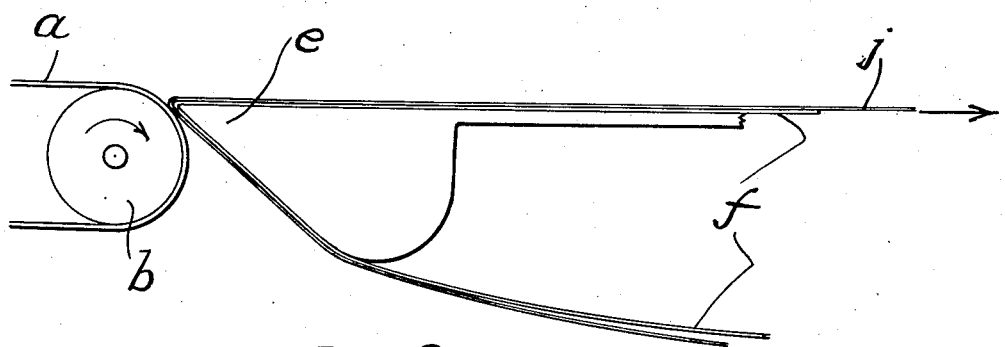
Figure 2 is a diagrammatic view showing a detail of the subject of Figure 1.
Figure 3:
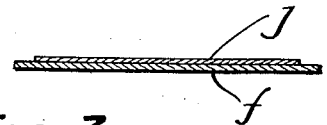
Figure 3 is a sectional view of an enrober belt in accordance with this invention.
Figure 4:
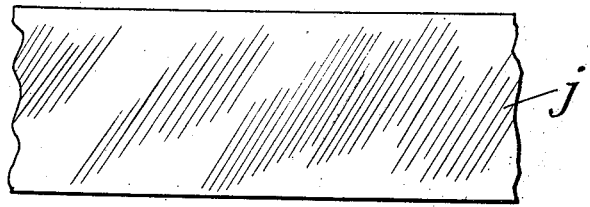
Figure 4 is a plan view of a length of the belt shown in Figure 3.

In the several figures $a$ indicates a conveyor adapted to travel in the direction of the arrow over a pulley $b$, Figure 1, and to carry candy bodies $c$ beneath the usual means $d$, for applying a coating, as molten chocolate, to the bodies. The conveyor $a$ may be of any well known type.

Adjacent to the pulley $b$ is positioned a support $e$ having a relatively sharp edge extending transversely of and relatively close to the conveyor $a$ in its passage over the pulley $b$. A belt $f$ passes around the edge of the support $e$, through a cooling chamber $g$ and over a driven pulley $h$. Idler pulleys $i$, $i$, over which the belt passes, maintain the belt $f$ under proper tension.

Overlying the belt $f$ and passing around the edge of support $e$ and around pulley $h$, but not around the idler pulleys $i$, $i$ is an enrober belt $j$.

The enrober belt proper, the subject of this invention, comprises the belt $j$, which serves as a conveyor whereby coated candies, received hot from the conveyor $a$ are carried into and through the cooler $g$.

The belt $f$ is one possessed of sufficient strength to take the drive and, at the same time, has sufficient flexibility to conform to the relatively sharp edge of the support $e$, it being noted that the belt is sharply turned adjacent to the end of the conveyor—to facilitate the removal of coated candies from the conveyor $a$. The belt $f$ may be of any desired material and construction, but desirably will be of the well known folded canvas type.

The enrober belt $j$ serves to receive and carry the coated candies and provides a surface such that the coated candies, after cooling of the coating, will not adhere thereto and will be freely discharged therefrom. The belt $j$ in accordance with this invention, will overlie the belt $f$ throughout the upper reach thereof and around the relatively sharp edge of the support $e$ and will be carried with or driven by the belt $f$. The belt $j$ will be composed specifically of a material comprising a silk fabric, impregnated essentially with Bakelite, a phenol formaldehyde resin, such, for example, as oiled silk as produced by the General Electric Company, which I have found lends itself peculiarly to combination with the belt $f$ to provide an enrober belt for the support of coated candies, in that it will engage with the belt $f$ in an efficient manner to insure an efficient drive, it will not be effected chemically by the candy coating, coated candies will not adhere to its surface and it will not be effected by changes in temperature.

The enrober belt $j$ will be uncoated, will desirably be of a single thickness, though, if desired, it may be folded or plied, and its edges will be plain. The belt $j$ will be of the desired flexibility, especially for conformation with the relatively sharp edge of support $e$ and will be of exceptional advantage in that, due to its surface characteristics, coated candies will not adhere to it on cooling, but, to the contrary, will remain entirely free and may be easily discharged from the surface of the belt.

It will be understood that variously the enrober belt $j$, according to this invention, may be used without the supporting and driving belt $f$ and in such cases will take the drive as well as convey the coated candies.

The enrober belt according to this invention will be found to possess great advantage over such belts as heretofore known. Thus, more particularly, it is unnecessary that the belt be coated and, as a consequence, it will not be subject to surface cracking or chipping. The surface of the belt will be of a smooth, polished character which will reproduce desired finish on the bottom of coated candies. The heat from the coated candies as received on the belt and the changing temperature involved in the passage of the belt from the receipt of coated candies through the cooler will not effect the belt and, at the same time, it will provide excellent cold transference in the cooler and hence afford a more effective and rapid cooling and hardening of coatings than obtainable with belts used heretofore. The belt will be found entirely resistant to chemical action from various coatings or ingredients thereof, such as is caused by the cocoa-butter in chocolate coating.

What I claim and desire to protect by Letters Patent is:

An enrober belt comprising a silk fabric impregnated with a phenol formaldehyde resin.

JACK T. BERRY.